US012249763B2

(12) United States Patent
Matitsine et al.

(10) Patent No.: US 12,249,763 B2
(45) Date of Patent: Mar. 11, 2025

(54) LENS ARRAYS CONFIGURATIONS FOR IMPROVED SIGNAL PERFORMANCE

(71) Applicant: Matsing, Inc., Irvine, CA (US)

(72) Inventors: Serguei Matitsine, Dallas, TX (US); Leonid Matytsine, Irvine, CA (US); Anthony DeMarco, Leadville, CO (US)

(73) Assignee: Matsing, Inc., Irvine, CA (US)

( * ) Notice: Subject to any disclaimer, the term of this patent is extended or adjusted under 35 U.S.C. 154(b) by 0 days.

(21) Appl. No.: 18/206,486

(22) Filed: Jun. 6, 2023

(65) Prior Publication Data

US 2023/0318195 A1 Oct. 5, 2023

Related U.S. Application Data

(63) Continuation of application No. 17/175,421, filed on Feb. 12, 2021, now Pat. No. 11,699,858, which is a continuation of application No. 16/178,540, filed on Nov. 1, 2018, now Pat. No. 10,923,828, which is a continuation of application No. 15/230,140, filed on Aug. 5, 2016, now Pat. No. 10,199,739.

(60) Provisional application No. 62/201,472, filed on Aug. 5, 2015.

(51) Int. Cl.
*H01Q 15/02* (2006.01)
*H01Q 21/00* (2006.01)

(52) U.S. Cl.
CPC ............ *H01Q 15/02* (2013.01); *H01Q 21/00* (2013.01); *H01Q 21/0031* (2013.01)

(58) Field of Classification Search
CPC ..... H01Q 15/02; H01Q 21/0031; H01Q 21/00
See application file for complete search history.

(56) References Cited

U.S. PATENT DOCUMENTS 3,386,099 A * 5/1968 Walter .................. H01Q 15/04 343/893
3,936,835 A 2/1976 Phelan
4,348,678 A * 9/1982 Thomas ............... H01Q 25/008 342/368

(Continued)

FOREIGN PATENT DOCUMENTS

| | | |
|---|---|---|
| WO | 200076028 | 12/2000 |
| WO | 2010092078 | 8/2010 |
| WO | 2014118011 | 8/2014 |

OTHER PUBLICATIONS

John D. Bunton, “The Tiltaz Mount—A Solution To Reduce Shadowing,” (5 pages) CSIRO Telecommunications and Industrial Physics, File Note JDB Mar. 26, 2001.

(Continued)

*Primary Examiner* — Hai V Tran
(74) *Attorney, Agent, or Firm* — Fish IP Law, LLP

(57) ABSTRACT

A lens elements array comprises at least two lens elements aligned along an alignment axis. Each lens element includes a spherical lens and a feed element. The feed elements are tilted such that the RF signals generated by the feed elements have major axes form an angle (preferably between 5° and 30°) other than a perpendicular angle with respect to the alignment axis. The combined RF signals produced collectively by these feed elements have amplitude that has minimal dips across the array. The feed elements that are farther away from the center of the array have higher levels of tilts than the feed elements that are closer to the center of the array.

17 Claims, 11 Drawing Sheets

(56) References Cited

U.S. PATENT DOCUMENTS

| | | | | |
|---|---|---|---|---|
| 5,781,163 | A * | 7/1998 | Ricardi .................. | H01Q 15/08 343/754 |
| 6,304,225 | B1 * | 10/2001 | Hemmi .................. | H01Q 21/22 343/753 |
| 6,590,498 | B2 | 7/2003 | Helms | |
| 7,400,304 | B2 * | 7/2008 | Lewis .................... | H01Q 15/23 343/753 |
| 8,149,091 | B2 | 4/2012 | Nagai et al. | |
| 8,284,102 | B2 | 10/2012 | Hayes et al. | |
| 10,165,398 | B2 | 12/2018 | Hershey et al. | |
| 2006/0028386 | A1 | 2/2006 | Ebling et al. | |
| 2007/0195004 | A1 | 8/2007 | Rebeiz et al. | |
| 2008/0048921 | A1 * | 2/2008 | Rebeiz ................. | H01Q 1/3233 343/754 |
| 2009/0201204 | A1 * | 8/2009 | Black, Jr. ............. | H01Q 25/008 342/372 |
| 2010/0171673 | A1 | 7/2010 | Guy et al. | |
| 2016/0111793 | A1 | 4/2016 | Montgomery et al. | |

OTHER PUBLICATIONS

Slavi Baev, Boyan Hadjistamov, Plamen Dankov, "Lüneburg Lenses as Communication Antennas," (pp. 67-84), Department of Radio Physics and Electronics, Faculty of Physics, University of Sofia.

Benjamin Fuchs, Laurent Le Coq, Olivier Lafond, Sebastien Rondineau, Mohamed Himdi, "Design Optimization of Multishell Luneburg Lenses," (pp. 283-289), IEEE Transactions on Antennas and Propagation, vol. 55, No. 2, Feb. 2007.

Lars Josefsson, Partik Persson "Conformal Array Antennas," (pp. 1-35), Handbook of Antenna Technologies DOI 10.1007/978-981-4560-75-7_65-1 © Springer Science+Business Media Singapore 2015.

James Debruin, Control Systems for Mobile Satcom Antennas, "Establishing and Maintaining High-Bandwidth Satellite Links During Vehicle Motion," ( pp. 86-101), Control Systems Magazine, vol. 28, Issue: 1, Feb. 2008.

Jan Peter Peeters Weem, "Broad Band Antenna Arrays And Noise Coupling For Radio Astronomy" A thesis submitted to the Faculty of the Graduate School of the University of Colorado, 2001, (136 pgs.).

Hossein Mosallaei, Yahya Rahmat-Samii, "Nonuniform Luneburg and Two-Shell Lens Antennas: Radiation Characteristics and Design Optimization," (pp. 60-69), IEEE Transactions on Antennas and Propagation, vol. 49, No. 1, Jan. 2001.

Graeme James, Andrew Parfitt, John Kot, Peter Hall, "A Case for the Luneburg Lens as the Antenna Element for the Square Kilometre Array Radio Telescope," CSIRO Telecommunications and Industrial Physics and Australia Telescope National Facility, Paper prepared for submission to The Radio Science Bulletin (10 pgs. ).

Bybi P. Chacko, Gijo Augustin, Tayeb A. Denidni, "Multi-beam Antenna Arrays," (pp. 1-34), Handbook of Antenna Technologies DOI 10.1007/978-981-4560-75-7_66-1 © Springer Science+ Business Media Singapore 2015.

* cited by examiner

LENS ARRAYS CONFIGURATIONS FOR IMPROVED SIGNAL PERFORMANCE

This application is a continuation of co-pending U.S. Non-Provisional application Ser. No. 17/175,421, filed Feb. 12, 2021, which is a continuation of co-pending U.S. non-provisional application Ser. No. 16/178,540, filed Nov. 1, 2018, which is a continuation of U.S. non-provisional application Ser. No. 15/230,140, filed Aug. 5, 2016, which is a continuation of U.S. provisional application No. 62/201,472 filed Aug. 5, 2015. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is radio frequency antenna technology.

BACKGROUND

The following description includes information that may be useful in understanding the present invention. It is not an admission that any of the information provided herein is prior art or relevant to the presently claimed invention, or that any publication specifically or implicitly referenced is prior art.

Radio and microwave frequencies are widely used in wireless communication. Antennae utilized in receiving and sending such signals are often used in conjunction with a reflector (e.g., a parabolic reflector) that serves to focus electromagnetic energy in the desired spectral range on a feed that is positioned at the focal point of the reflector and is in communication with a receiver or transmitter. Such an arrangement, however, requires repositioning or aiming of the reflector in order to direct it towards different sources.

As an alternative to the use of a reflector, a lens capable of focusing radio frequency (RF) or microwave frequencies can be used. One suitable lens is a Luneburg lens, a spherically (or substantially spherical) symmetrical lens with a refractive index gradient that decreases from the center to the surface of the sphere. Electromagnetic energy traveling through such a lens necessarily takes the path that it can traverse in the least amount of time. In a classical Luneburg lens the gradient of refractive index is selected so that a focal point for electromagnetic energy impinging across a portion of the sphere is located on the opposing surface of the sphere. Some variations of the Luneburg lens are configured to place the focal point slightly beyond the opposing surface of the sphere in order to accommodate certain feed designs (such as a feed horn). The use of a Luneburg lens permits movement changing the direction of observation or transmission by simply moving the feed about the surface of the lens. In some designs, multiple feeds are arranged on or about the lens in order to permit gathering radio or microwave energy from a number of directions simultaneously without the need to move either the lens or the feeds. For example, a multi-beam station based on a single Luneburg lens can cover 120° in azimuth and thus support multiple beams. In a typical installation, a 1.8 meter spherical Luneburg antenna can support 12 beams having a 10° beam width at 10 dB separation for frequencies of 1.7 to 2.7 GHz. Increasing capacity beyond this can be accomplished by decreasing the beam width along the azimuth plane, however this restricts the utility of the device. An alternative is to increase the size of the Luneburg lens, however this approach rapidly encounters issues with the manufacturability of large lenses and the practical issues introduced by the size and weight of the larger lens.

One solution to this problem is to provide multiple lenses, where each lens is equipped with a single feed and where individual feeds are oriented towards different directions. In order to minimize space requirements such lens arrays are typically arranged on a plane in a linear fashion. Unfortunately, such an arrangement greatly restricts the relative angles of reception/transmission of adjacent feeds due to intersection of the transmitted or received signal with a portion of an adjacent lens. For example, in a conventional horizontal arrangement beams with a beam orientation of greater than 30° in the azimuth plane will intersect adjacent lenses. Such antenna arrays are also subject to the generation of undesirable grating lobes as a result of rapid decreases in field amplitudes between adjacent lenses.

Thus, there is still a need for a simple and effective device for providing accessible foci for radio and/or microwave frequencies from multiple directions All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

SUMMARY OF THE INVENTION

The inventive subject matter provides apparatus, systems and methods in which two or more spherical lenses are each associated with individual feed elements, and in which the spherical lenses are arranged in an array in an offset fashion such that electromagnetic energy focused by a first lens onto a first feed element does not intersect a second lens of the array. Grating lobes can be minimized in such arrangements by orienting radiating feeds towards the center of the lens array.

In another aspect of the inventive subject matter, the feed elements in a spherical lens elements array are tilted in a way such that the amplitude of the combined RF signals generated collectively by the feed elements in the array has minimal dips across the array.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
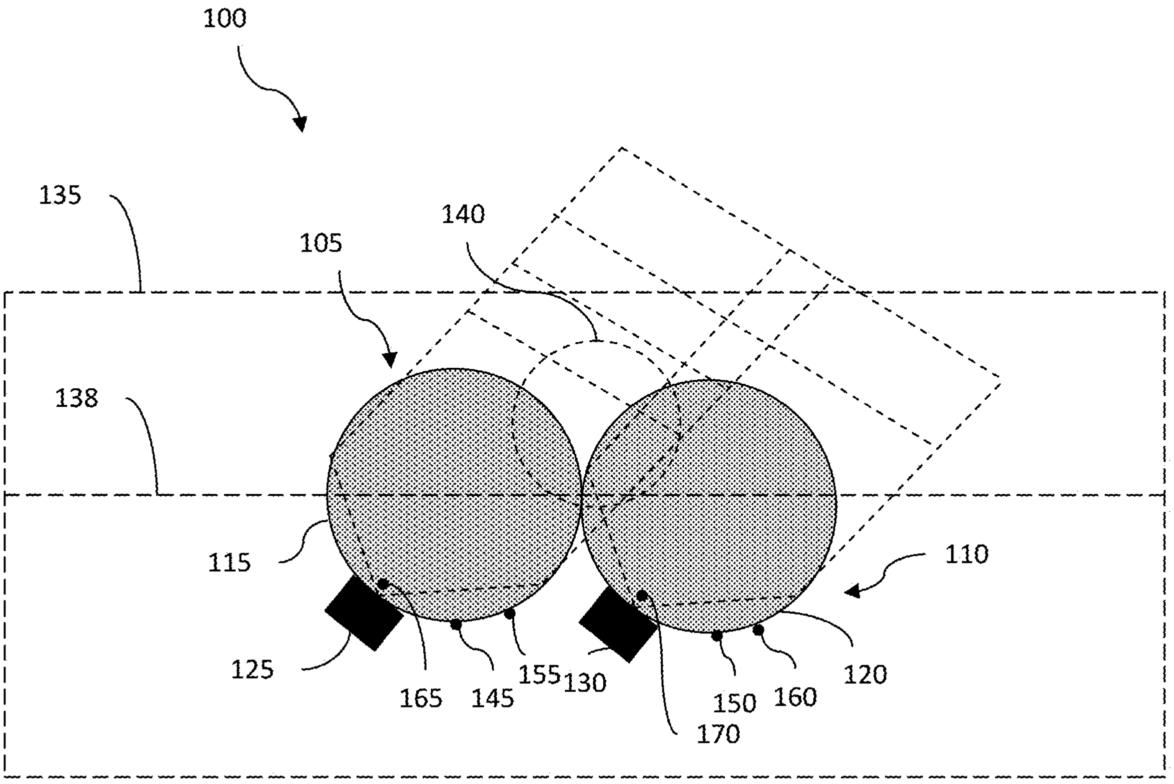
FIG. 1 illustrates a top view of a conventional lens array arrangement.

Throughout the following discussion, numerous references will be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, DSP, x86, ARM, ColdFire, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, a circuit-switched network, the Internet, LAN, WAN, VPN, or other type of network.

As used in the description herein and throughout the claims that follow, when a system, engine, or a module is described as configured to perform a set of functions, the meaning of "configured to" or "programmed to" is defined as one or more processors being programmed by a set of software instructions to perform the set of functions.

The following discussion provides example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the inventive subject matter are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the inventive subject matter are approximations, the numerical values set forth in the specific examples are reported as precisely as practicable. The numerical values presented in some embodiments of the inventive subject matter may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Unless the context dictates the contrary, all ranges set forth herein should be interpreted as being inclusive of their endpoints and open-ended ranges should be interpreted to include only commercially practical values. The recitation of ranges of values herein is merely intended to serve as a shorthand method of referring individually to each separate value falling within the range. Unless otherwise indicated herein, each individual value within a range is incorporated into the specification as if it were individually recited herein. Similarly, all lists of values should be considered as inclusive of intermediate values unless the context indicates the contrary.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the inventive subject matter and does not pose a limitation on the scope of the inventive subject matter otherwise claimed. No language in the specification should be construed as indicating any non-claimed element essential to the practice of the inventive subject matter.

Groupings of alternative elements or embodiments of the inventive subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

In one aspect of the inventive subject matter, a lens array arrangement that includes multiple spherical lenses is provided to achieve improved signal performance and reduce signal interferences between adjacent lenses is provided. The lens array includes two sub arrays of lenses. The lenses in the first sub array are aligned along a first plane, while the lenses in the second sub array are aligned along a second plane that is parallel to the first plane, but having a perpendicular offset from the first plane. Each lens in the second sub array is disposed in between two adjacent lenses in the first sub array, such that adjacent lenses in the lens array are not aligned on the same plane. This arrangement of lenses in the array has the effect of reducing signal interferences and impingement between adjacent lens elements.

A spherical lens is a lens with an exterior surface having a shape of (or substantially having a shape of) a sphere. As defined herein, a lens with a surface that substantially conform to the shape of a sphere means at least 50% (preferably at least 80%, and even more preferably at least 90%) of the surface area conforms to the shape of a sphere. Examples of spherical lenses include a spherical-shell lens, the Luneburg lens, drum-shaped lens (a sphere with the top and bottom portions cut off and flattened), etc. The spherical lens can include only one layer of dielectric material, or multiple layers of dielectric material. A conventional Luneburg lens is a spherically symmetric lens that has multiple layers inside the sphere with varying indices of refraction.

In some embodiments, the lens array includes multiple lens elements. Each lens element includes a spherical lens and at least one feed element. The feed element is an electronic device for emitting RF signals, detecting RF signals, or both. In some embodiments, the feed element is disposed near the surface of the spherical lens (e.g., within 5 inches, preferably within 2 inches of the surface of the lens). Preferably, each lens element also includes a mechanism for moving the feed element along the surface of the lens in order to adjust the angles and direction in which the feed element emits/receives the RF signals. Details of this mechanism for moving the feed elements can be found in a co-owned U.S. patent application Ser. No. 14/958,607, titled "Spherical Lens Array Based Multi-Beam Antennae," filed Dec. 3, 2015, which is incorporated in its entirety herein by reference.

FIG. 1 illustrates a top view of a conventional arrangement of a lens array 100. The lens array 100 is shown to include two lens elements 105 and 110 adjacent to each other, however, more lens elements can be included in this lens array 100. Each lens element includes a spherical lens and a feed element. For example, the lens element 105 includes a spherical lens 115 and a feed element 125, and the lens element 110 includes a spherical lens 120 and a feed element 130. As shown, the lens elements 105 and 110 are aligned along a virtual plane 135. In some embodiments, the virtual plane 135 is parallel to the ground on top of which the lens array 100 is disposed.

The feed elements 125 and 130 are configured to emit and/or receive RF signals via the lenses 115 and 120. When the feed elements 125 and 130 are positioned along the surface of the lenses 115 and 120 to emit RF signals having a major axis that is perpendicular to the plane 135 (e.g., at positions 145 and 150), the signals emitted by the feed elements 125 and 130 will be in-phase, and do not cause interference or impingement with each other. As defined herein, the major axis of an RF signal refers to the axis of an ellipse representing amplitude of the RF signal.

However, when the feed elements 125 and 130 are positioned along the surface of the lenses 115 and 120 to emit RF signals having a major axis that is not perpendicular to the plane 135 (e.g., at positions 165 and 170), a portion (e.g., the portion of the signals within the area 140) of the RF signal emitted by the feed element 125 would impinge on the RF signal emitted by the feed element 130. The impingement causes reduction in quality of the signals being transmitted by the lens array, resulting in undesirable distortion and defocusing in that portion of the signal. Similarly, the RF signal emitted by the feed element 130 would impinge on the RF signal emitted by the feed element 125 when the feed elements 125 and 140 are at positions 155 and 160.

Figure 2:
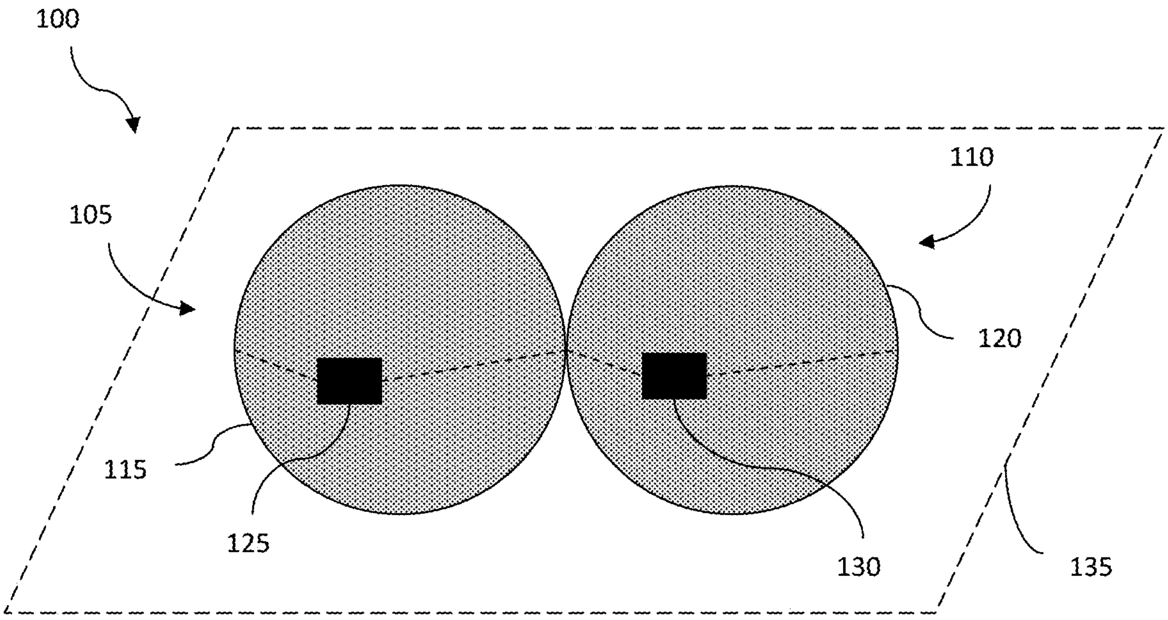
FIG. 2 illustrates a side view of the conventional lens array arrangement.

FIG. 2 illustrates a side view of the lens array 100 that includes the lens elements 105 and 110. The lens elements 105 and 110 are arranged on the plane 135.

Figure 3:
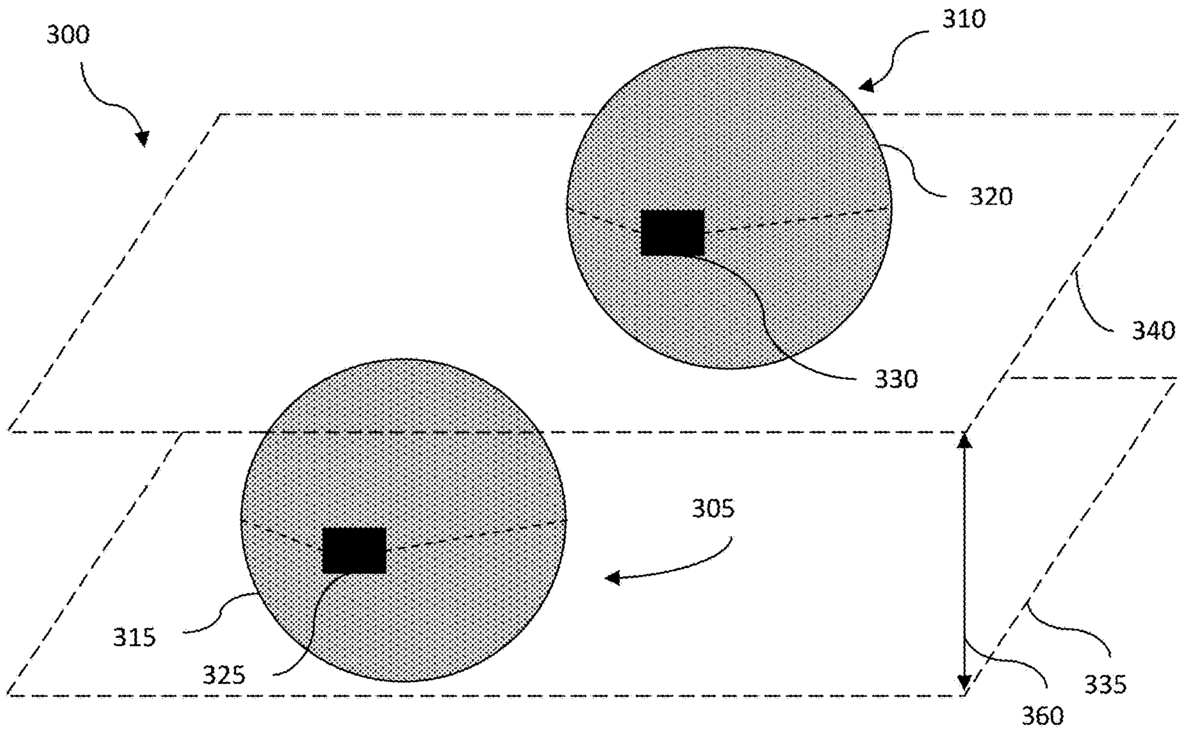
FIG. 3 illustrates a side view of a lens array arrangement of some embodiments that reduce impingement.

FIG. 3 illustrates a side view of a lens array 300 that is arranged according to some embodiments of the inventive subject matter. The lens array 300 includes lens elements 305 and, 310. Each lens element includes a spherical lens and a feed element. For example, the lens element 305 includes a spherical lens 315 and a feed element 325, and the lens element 310 includes a spherical lens 320 and a feed element 330.

As shown, the lens element 305 is arranged on a virtual plane 335 while the lens element 310 is arranged on a virtual plane 340. The virtual planes 335 and 340 are perpendicular to the drawing sheet. The virtual planes 335 and 340 are parallel to each other (and in some embodiments also parallel to the ground on top of which the lens array 300 is disposed) while having an offset 360 in a direction that is perpendicular to the planes 335 and 340. In some embodiments, the offset 360 between the planes 335 and 340 is at least 50% of the height of the spherical lenses 315 and 320. Preferably, the offset 360 between the planes 335 and 340 is at least 60% (even more preferably at least 70%) of the height of the spherical lenses 315 and 320. Preferably, the offset 360 is less than 100% of the height of the spherical lenses 315 and 320. As defined herein, the height of a spherical lens is calculated along a dimension of the spherical lens that is perpendicular to the planes 335 and 340. In some embodiments, the lens elements 305 and 310 are also arranged on another plane that is perpendicular to the virtual planes 335 and 340 (parallel to the drawing sheet).

The vertical offset of adjacent lens elements in the lens array 300 has the effect of eliminating entirely or at least reducing impingement of the signals received by or transmitted from the adjacent lens elements. This arrangement advantageously reduces or eliminates distortion, loss of focus, and absorption of such signals by the adjacent lens without increasing the size or weight of individual lens elements.

Figure 4:
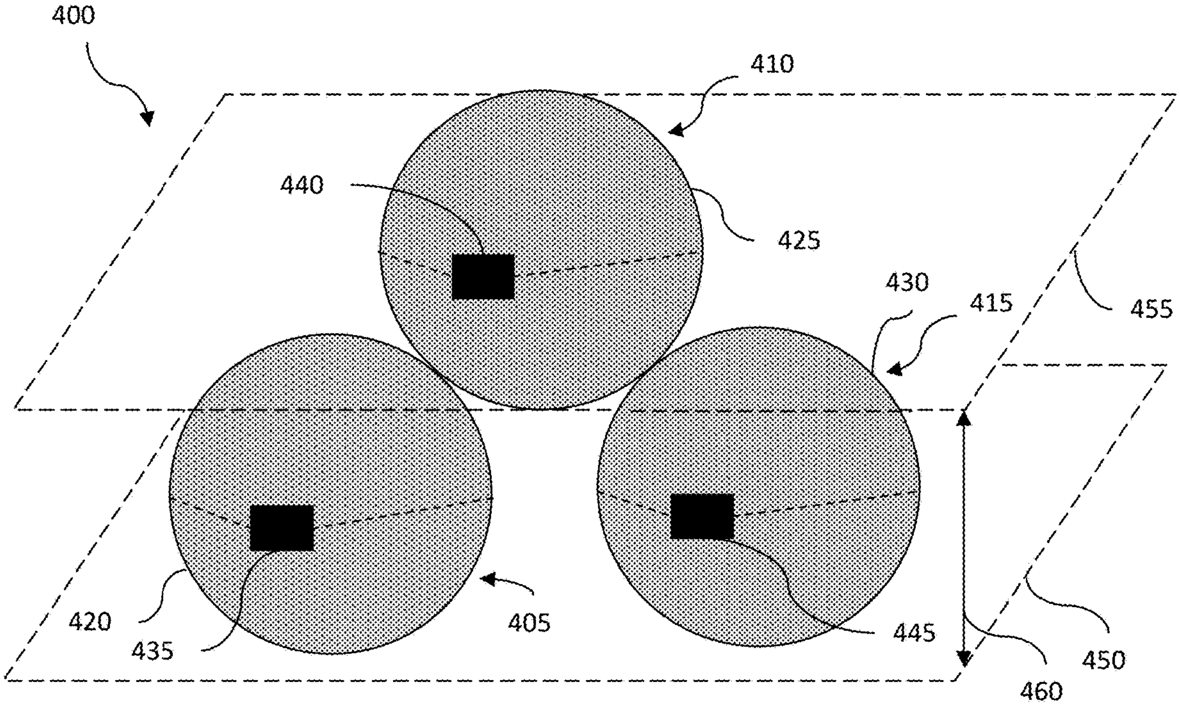
FIG. 4 illustrates a side view of another lens array arrangement of some embodiments that reduce impingement.

It is conceived that the arrangement of lens array 300 can be extended to form a chessboard pattern. FIG. 4 illustrates a side view of a lens array 400 that is arranged according to this chessboard pattern. The lens array 400 includes lens elements 405 and, 410, and 415. Each lens element includes a spherical lens and a feed element. For example, the lens element 405 includes a spherical lens 420 and a feed element 435, the lens element 410 includes a spherical lens 425 and a feed element 440, and the lens element 415 includes a spherical lens 430 and a feed element 445.

As shown, the lens elements 405 and 415 are arranged on a virtual plane 450 while the lens element 410 is arranged on a virtual plane 455. The virtual planes 450 and 455 are perpendicular to the drawing sheet. The lens elements 405 and 415 forms a sub-array, while the lens element 410 (can have additional lens element that is not shown in this figure) forms another sub-array. The planes 450 and 455 are parallel to each other while having an offset 460 in a direction that is perpendicular to the planes 450 and 455. In some embodiments, the offset 460 between the planes 450 and 455 is at least 50% of the height of the spherical lenses 420, 425, and 430. Preferably, the offset 460 between the planes 450 and

455 is at least 60% (even more preferably at least 70%) of the height of the spherical lenses 420, 425, and 430. In some embodiments, the lens elements 405, 410, and 415 are also arranged on another virtual plane that is perpendicular to the planes 450 and 455 (parallel to the drawing sheet).

The lens element 410 that is arranged on the plane 455 is disposed in between the lens elements 405 and 415. Specifically, a portion of the spherical lens 425 of the lens element 410 is disposed within the space (gap) in between the lens elements 405 and 415. In some embodiments, the space between the adjacent lens elements within a sub array (e.g., the lens elements 405 and 415) is less than the width of a spherical lens (e.g., spherical lenses 420, 425, and 430). As defined herein, the width of a lens is measured along a dimension of the spherical lens that is parallel to the virtual planes 450 and 455.

Although the lens array 400 shown in FIG. 4 includes one lens element 410 that is arranged on top of two lens elements 405 and 415, it is contemplated that the lens element 410 can also be arranged below the lens elements 405 and 415 and provide the same benefits. That is, the virtual plane 455 is parallel but below the virtual plane 450 with the same offset 460.

The vertical offset of adjacent lens elements in this arrangement relative to the azimuth plane (horizontal plane that is parallel to the ground) avoids mutual impingement of the signals received by or transmitted from the lens/feed element units adjacent to each other. At the same time, the space provided between the coplanar lens/feed element units prevents impingement between these lens/feed element units.

Figure 5:
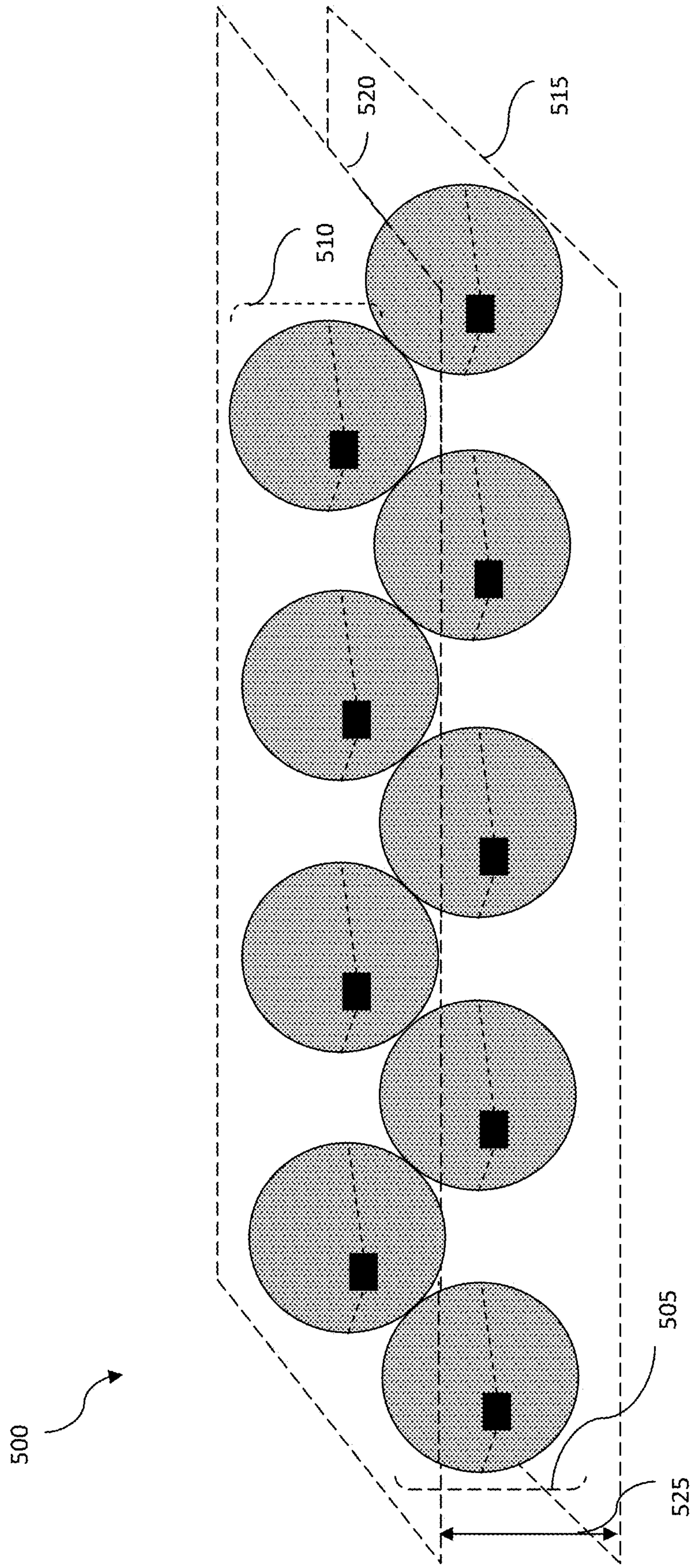
FIG. 5 illustrates a side view of yet another lens array arrangement of some embodiments that reduce impingement.

It should be appreciated that the basic unit arrangement shown in FIG. 4 can be propagated horizontally, providing a first sub-array of lens elements on a first virtual plane and a second sub-array of lens elements on a second virtual plane having a vertical offset to the first virtual plane. FIG. 5 illustrates a side view of a lens array 500 that is arranged under this approach. The lens array 500 includes a first sub-array of lens elements 505 that are arranged on a virtual plane 515, and a second sub-array of lens elements 510 that are arranged on a virtual plane 520 having a vertical offset 525. The virtual planes 515 and 520 are perpendicular to the drawing sheet. As shown, each of the lens elements in the sub-array 510 is disposed in between two adjacent lens elements in the sub-array 505. Furthermore, each pair of adjacent lens elements in the first sub-array 505 has a space offset between each other that is parallel to the plane 515. Similarly, each pair of adjacent lens elements in the second sub-array 510 also has a space offset between each other that is parallel to the plane 520. In some embodiments, the lenses in the lens array 500 are also arranged on another virtual plane that is perpendicular to the virtual planes 515 and 520 (parallel to the drawing sheet).

Figure 6:
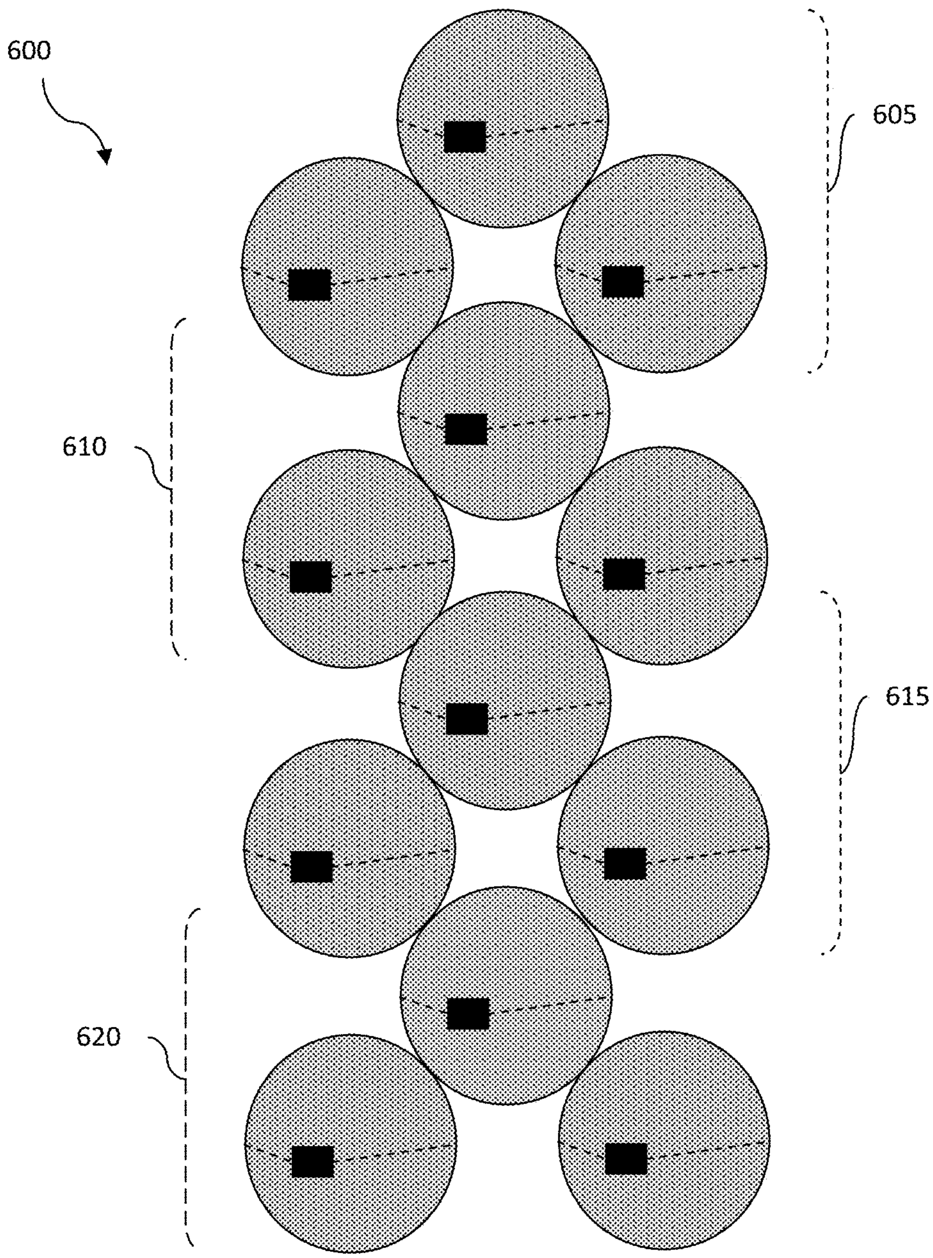
FIG. 6 illustrates a side view of yet another lens array arrangement of some embodiments that reduce impingement.

It is also appreciated that the basic unit arrangement shown in FIG. 4 can be propagated vertically. FIG. 6 illustrates a side view of a lens array 600 that is arranged under this approach. The lens array 600 includes a vertical array of the basic unit arrangement shown in FIG. 4. As shown, the lens array 600 includes basic units 605, 610, 615, and 620. Each of the basic units 605, 610, 615, and 620 includes three lens elements arranged substantially the same way as the lens array 400 in FIG. 4.

Although the lens array 600 shown in FIG. 6 includes four basic units of lens elements, it is contemplated that a lens array can include more than four or less than four of these basic units of lens elements without departing from the inventive concept.

Figure 7:
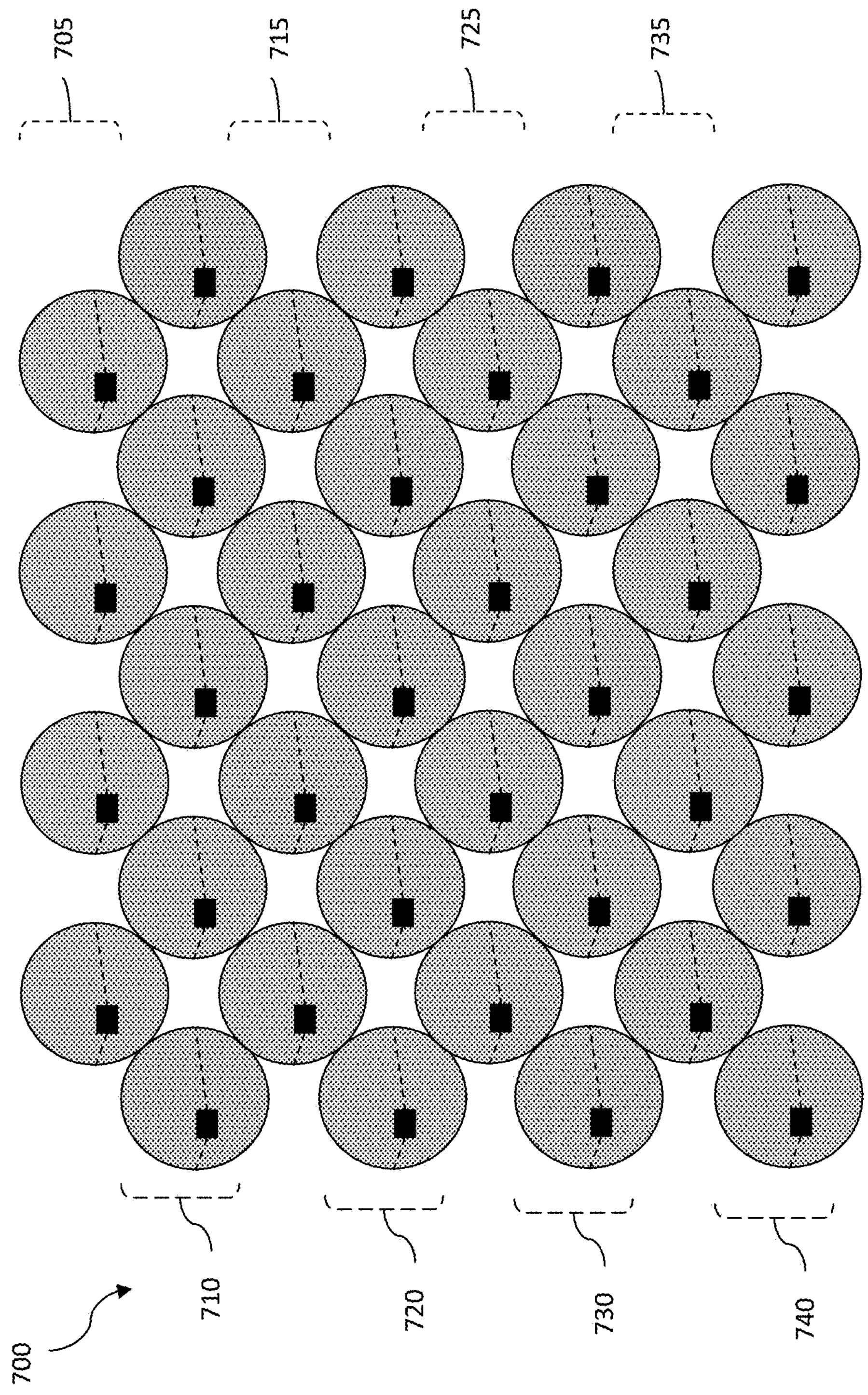
FIG. 7 illustrates a side view of yet another lens array arrangement of some embodiments that reduce impingement.

Alternatively, the basic unit arrangement shown in FIG. 4 can be propagated both horizontally and vertically to generate a two dimensional arrays resembling a chess board or hexagonal array. Such an arrangement advantageously provides a relatively compact antenna/feed element array without requiring special manufacturing methods and/or materials. FIG. 7 illustrates a side view of a lens array 700 arranged under this approach. The lens array 700 includes a two-dimensional array of the basic units shown in FIG. 4. In other words, the lens array 700 includes multiple sub-arrays of lens elements, each sub-array of lens elements include lens elements that are arranged on a distinct virtual plane. In this example, the lens array 700 includes eight sub-arrays of lens elements 705, 710, 715, 720, 725, 730, 735, and 740.

The virtual planes of each pair of adjacent sub-array of lens elements have a vertical offset that is substantially similar to the offset 460 in FIG. 4. Each pair of adjacent lens elements in a sub-array also has a horizontal spacing that is similar to the spacing between lens elements 405 and 415.

In another aspect of the inventive subject matter, a lens array with the two end (most outward) lens elements in the array having feed elements angled toward each other is presented. It is noted that arrays of lens/feed element units tend to develop unwanted grating lobes, represented by relatively large drops in amplitude between adjacent lenses. This phenomenon is illustrated in FIG. 8, which depicts a conventional arrangement of lenses and feed elements.

Figure 8:
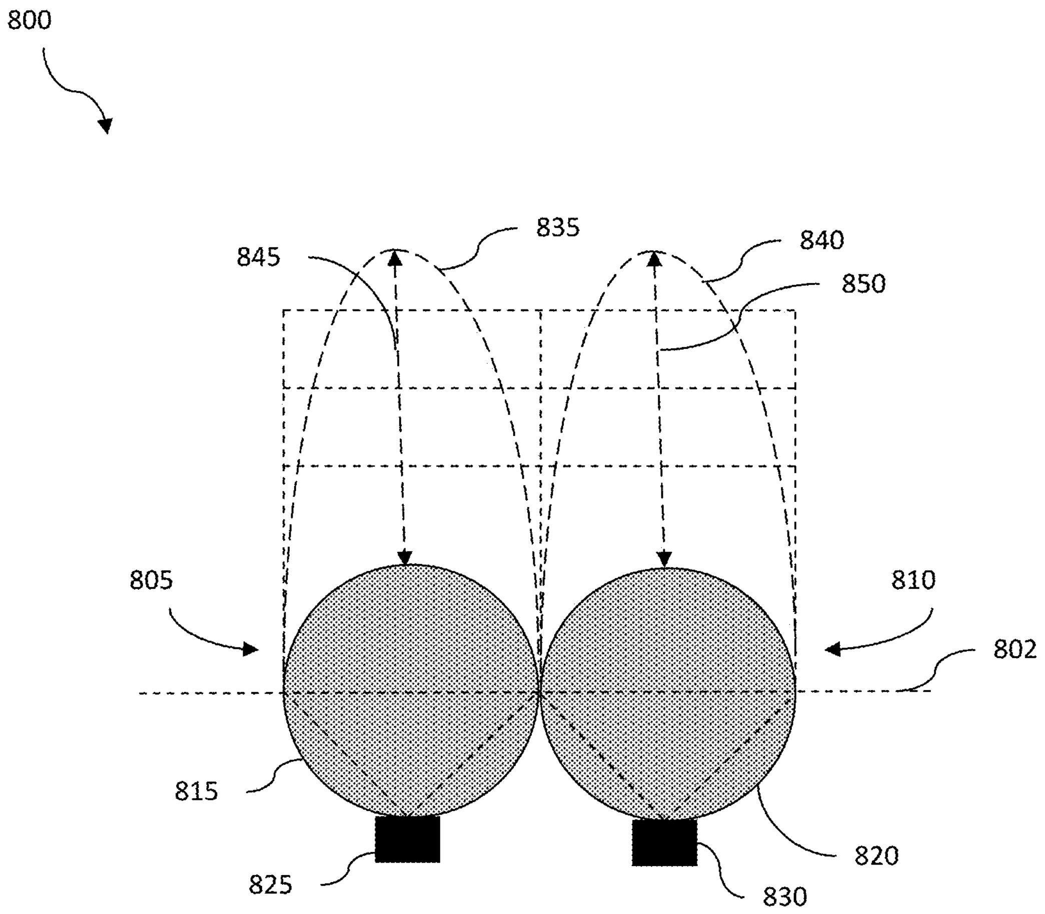
FIG. 8 illustrates a side view of a conventional lens array configuration

FIG. 8 illustrates a top view of a pair of adjacent lens elements 805 and 810. The pair of adjacent lens elements are aligned along an axis 802. Each lens elements includes a spherical lens and a feed element. For example, the lens element 805 includes a spherical lens 815 and a feed element 825, and the lens element 810 includes a spherical lens 820 and a feed element 830. Each of the feed elements 825 and 830 is configured to generate an RF signal having amplitude. For example, FIG. 8 shows amplitude 835 of an RF signal generated by the feed element 825 through the spherical lens 815, and amplitude 840 of an RF signal generated by the feed element 830 through the spherical lens 820. The amplitudes 835 and 840 each has a major axis representing a direction of the corresponding amplitude. In this example, the amplitude 835 has a major axis 845 that is perpendicular to the axis 802, and the amplitude 840 also has a major axis 850 that is perpendicular to the axis 802, as the feed elements 825 and 830 are configured to transmit the RF signals in the same direction perpendicular to the axis 802 along which the lens elements 805 and 810 are aligned. As the amplitude of the RF signal from the lens elements 805 and 810 collectively can be measured by a sum of the amplitude from the RF signals generated by individual lens elements 805 and 810, it can be seen that the combined amplitude (i.e., power) of the RF signal suffers a dramatic dip in the center (i.e., in between the two lens elements 805 and 810), which is undesirable.

Figure 9:
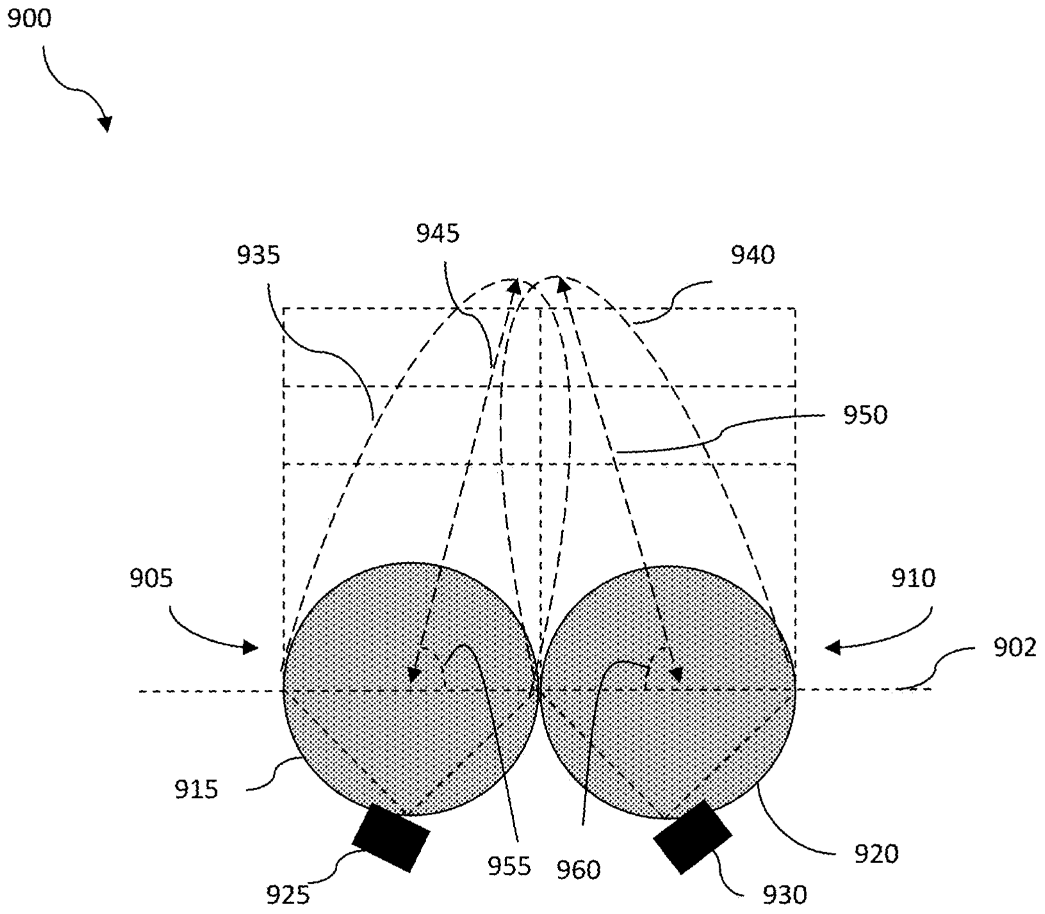
FIG. 9 illustrates a side view of a lens array configuration that provides improved overall signal pattern.

FIG. 9 illustrates a configuration of lens elements 900 that would alleviate the amplitude dip issue illustrated in FIG. 8. The lens elements configuration 900 includes two lens elements 905 and 910. The lens elements 905 and 910 are aligned along an axis 902. Each lens element has a spherical lens and a feed element. In this example, the lens element 905 has a spherical lens 915 and a feed element 925, and the lens element 910 has a spherical lens 920 and a feed element 930. The configuration 900 is very similar to the lens configuration shown in FIG. 8, the two lens elements 905 and 910 are adjacent to (very close to or even in contact with) each other. The feed elements 925 and 930 are configured to transmit RF signals in a direction that is perpendicular to the axis 902. Similar to the feed elements 825 and 830, the feed elements 925 and 930 are configured to generate RF signals having amplitudes. In this example, the feed element 925 is configured to generate RF signals having amplitude 935 through the spherical lens 915, and the feed element 930 is configured to generate RF signals having amplitude 940 through the spherical lens 920. The amplitudes 935 and 940 each has a major axis representing a direction of the corresponding amplitude. The amplitude 935 has a major axis 945 and the amplitude 940 has a major axis 950.

In order to alleviate the amplitude dip, the feed elements 925 and 930 are angled toward each other such that the major axes 945 and 950 are no longer perpendicular to the axis 902. Specifically, the major axes 945 and 950 are not perpendicular to the axis 902. Instead, each one of the major axes 945 and 950 forms an angle with respect to the axis 902. As shown, the major axis 945 forms an angle 955 with respect to the axis 902 while the major axis 950 forms an angle 960 with respect to the axis 902. In some embodiments, the feed elements 925 and 930 are oriented such that the angle 955 is substantially (e.g., at least 90%, at least 95%, etc.) the same as the angle 960, but in the opposite direction. In other words, the major axes 945 and 950 converge in the direction of the RF signal amplitudes. Preferably, the feed elements 925 and 930 are oriented in a way such that the angles 955 and 960 are between 5° and 30°, inclusively. Even more preferably the feed elements 925 and 930 are oriented in a way such that the angles 955 and 960 are between 10° and 20°, inclusively.

FIG. 9 illustrates a lens elements configuration that involves two lens elements. It is contemplated that this approach of lens elements configuration can also be applied to an array of lens elements having more than two lens elements. When the array of lens elements has more than two lens elements, the two outside lens elements (end lens elements) in the array would have feed elements tilted (angled or oriented) toward each other. In other words the two end lens elements are tilted in a way that produce RF signals with a major axis forming an angle other than right angle with respect to the axis along which the array of lens elements are aligned.

Figure 10:
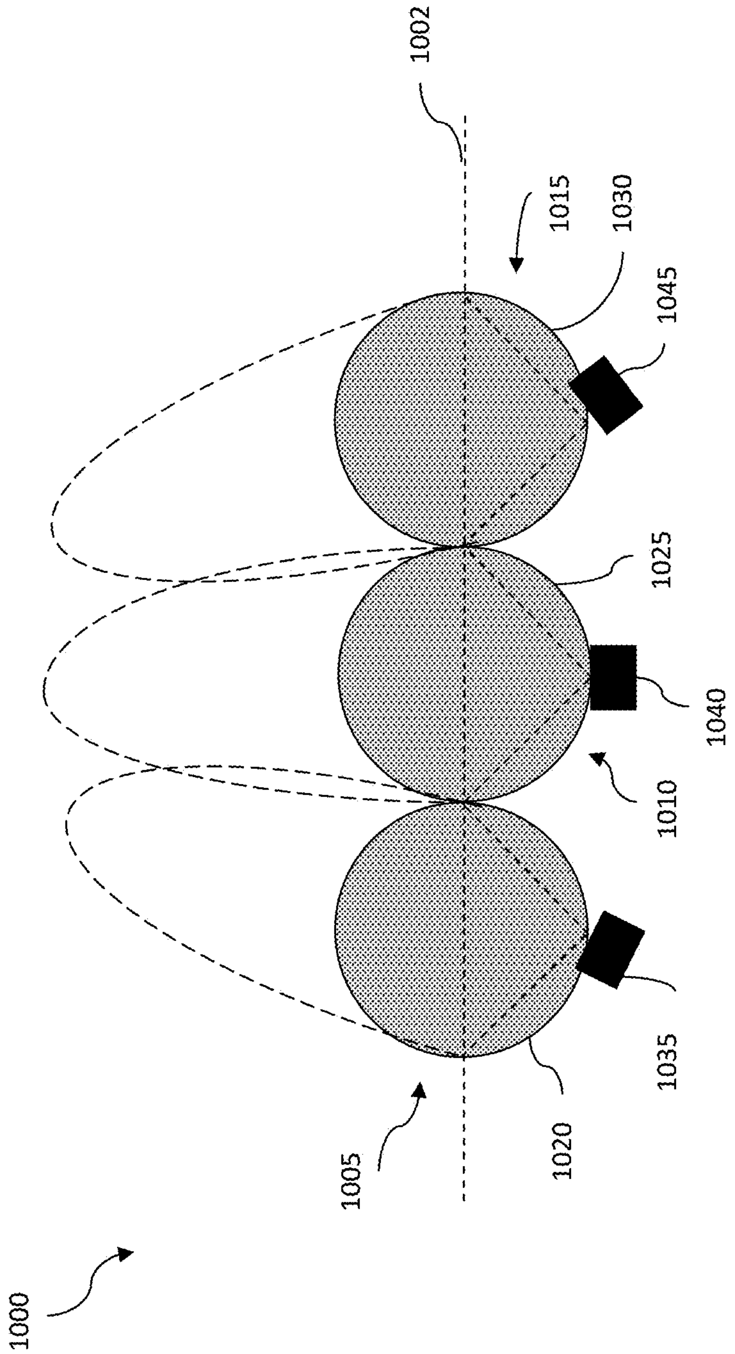
FIG. 10 illustrate a side view of another lens array configuration that provides improved overall signal pattern.

When the lens elements array has an odd number of lens elements, the feed element of the center lens element is oriented in its normal operational orientation to produce RF signals having a major axis that is perpendicular to the axis along which the lens elements in the array are aligned. FIG. 10 illustrates an example lens elements array 1000 according to this configuration. In this example, the lens elements array 100 has three lens elements: lens elements 1005, 1010, and 1015. The lens elements 1005, 1010, and 1015 are aligned along an axis 1002. Each lens element has a spherical lens and a feed element. In this example, the lens element 1005 has a spherical lens 1020 and a feed element 1035, the lens element 1010 has a spherical lens 1025 and a feed element 1040, and the lens element 1015 has a spherical lens 1030 and a feed element 1045. The end lens elements 1005 and 1015 have the same configuration as the lens elements 905 and 910, where the feed elements 1035 and 1045 are oriented (tilted or angled) toward each other such that the RF signals have major axes that are not perpendicular with respect to the axis 1002. The major axes instead form an angle with the 1002, and converge with each other in the direction of the RF signals amplitude.

Figure 11:
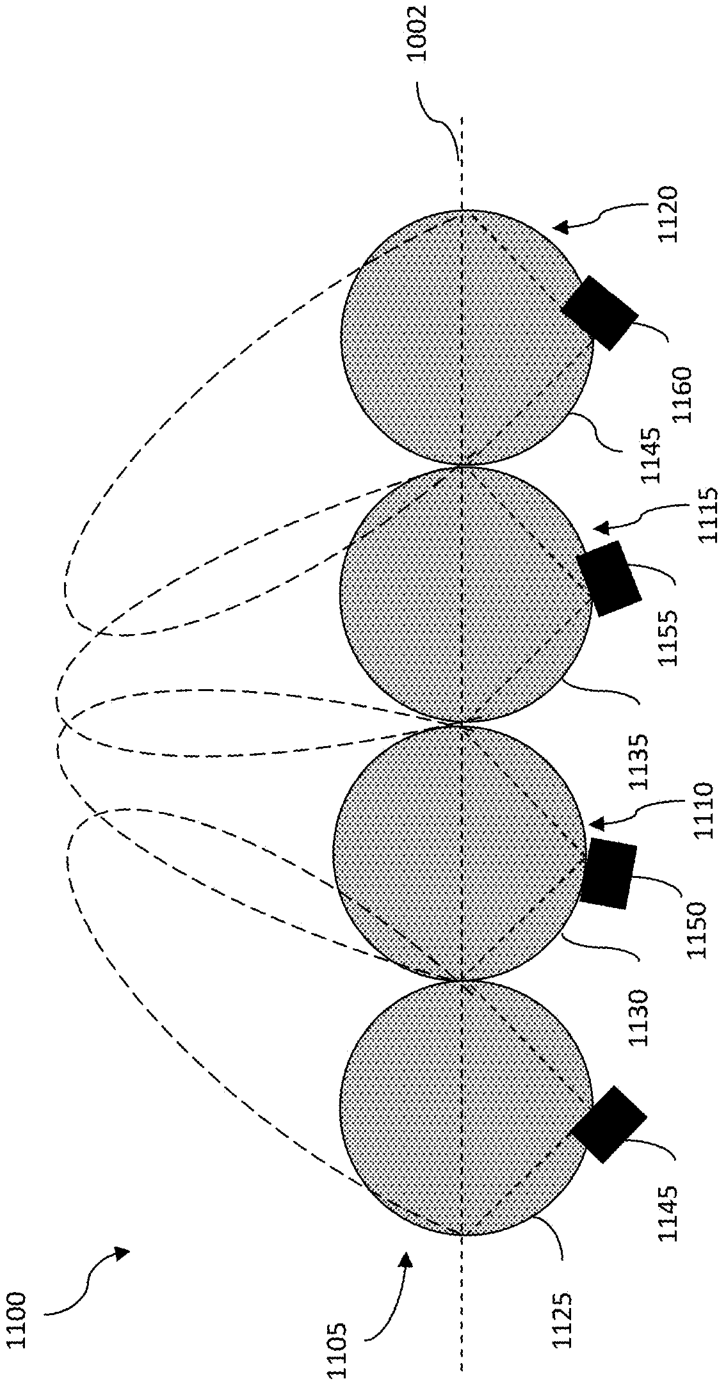
FIG. 11 illustrate a side view of another lens array configuration that provides improved overall signal pattern.

When the lens elements array has more than three lens elements, the feed elements of the lens elements other than the center element (if the array has an odd number of lens elements) are also oriented such that their respective major axes converge in the direction toward the center of the array. FIG. 11 illustrates an example lens elements array 1100 according to this lens elements configuration approach. The lens elements array 1100 has four lens elements: lens elements 1105, 1110, 1115, and 1120. The lens elements 1105, 1110, 1115, and 1120 are aligned along an axis 1102. Each lens element has a spherical lens and a feed element. In this example, the lens element 1105 has a spherical lens 1025 and a feed element 1045, the lens element 1110 has a spherical lens 1030 and a feed element 1050, the lens element 1115 has a spherical lens 1035 and a feed element 1155, and the lens element 1120 has a spherical lens 1040 and a feed element 1160. Since the lens elements array 1100 has an even number of lens elements, there is no center lens element in this array 1100. As shown, the feed element of each lens element in the array 1100 is oriented (tilted or angled) in such a way that the major axis of the RF signals generated by the feed element form an angle other than right angle with respect to the axis 1102 (not perpendicular to axis 1102). Specifically, the major axes converge with each other in the direction of the RF signals amplitude.

Furthermore, it is contemplated that the feed elements of the lens elements that are located farther away from the center of the lens array 1100 (e.g., the lens elements 1105 and 1120) are oriented such that the major axes form a smaller angle with respect to the axis 1102 (i.e., the feed elements are more tilted toward each other) than the feed elements of the lens elements that are more toward the inside of the lens array 1100 (e.g., the lens elements 1110 and 1115). In other words, the farther away the lens elements are located from the center of the array 1100, the more tiled are the feed elements. Similarly, the closer the lens elements are located from the center of the array 1100, the less tilted are the feed elements. Similar to the configuration in FIG. 9, each lens element is paired up with another lens element that has the same distance from the center of the lens array 1100. The feed elements in each pair should be tiled substantially at the same angle. In this example, the feed elements 1145 and 1160 are tilted substantially at the same angle, while the feed elements 1150 and 1155 are tilted substantially at the same angle. Although FIG. 11 shows only four lens elements, more lens elements can be included in the lens elements array 1100 under this approach.

It is important to note that while these feed elements are tiled (angled or oriented) with respect to the axis along which the lens elements are aligned in the array, the locations of the feed elements remained the same, which is parallel to the axis. The feed elements are still located in the positions along the surfaces of the spherical lenses to generate RF signals in the direction that is perpendicular to the axis, and as such, the feed elements are not relocated to another position along the surface of the spherical lenses to achieve this result.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A lens array comprising a first lens element comprising a first lens and a first feed element, wherein the first lens element is arranged on a first plane;

a second lens element comprising a second lens and a second feed element; and a third lens element arranged along the first plane;

wherein the second lens element is arranged on a second plane parallel to the first plane, and wherein at least one of (1) the second plane is offset from the first plane by a first distance or (2) the second lens element is offset from the first lens element by the first distance.

2. The lens array of claim 1, wherein the first distance is sufficiently large that electromagnetic radiation directed to or emitted from the first feed element does not impinge upon the second lens element.

3. The lens array of claim 2, wherein the first distance is at least equal to 50% of a height of the first lens from the first plane.

4. The lens array of claim 2, wherein the first distance is at most equal to 100% of a height of the first lens from the first plane.

5. The lens array of claim 2, wherein the first lens element and the second lens element are aligned on a third plane that is perpendicular to the first plane.

6. The lens array of claim 5, wherein radiation directed to or emitted from the second feed element does not impinge upon the first lens or impinge upon the third lens.

7. The lens array of claim 5, wherein a space between the first lens element and the third lens element is sufficiently large such that electromagnetic radiation directed to or emitted from the first feed element does not impinge upon the third lens.

8. The lens array of claim 5, wherein the first, second, and third lens element are aligned on a third plane that is perpendicular to the first plane.

9. The lens array of claim 1, wherein the third lens element is offset from the first lens element by at least a second distance, and wherein at least a portion of the second lens element is disposed between the third lens element and the first lens element.

10. The lens array of claim 1, wherein each of the first lens and the second lens comprises a Luneburg lens.

11. The lens array of claim 1, wherein the first lens element and the second lens element are configured to transmit and receive signals in microwave or radio frequencies.

12. A lens array comprising:

a plurality of basic array units, wherein each basic array unit comprises a first lens element, a second lens element, and a third lens element, wherein the first lens element is arranged on a first plane, the second lens element is arranged on a second plane, and the third lens element is arranged on a third plane with a space between the first lens element and the third lens element, wherein at least a portion of the second lens element is disposed within the space, and wherein the plurality of basic array units are arranged along one of an axis that is at least one of parallel of and perpendicular to the first plane to form a high order array; and wherein the third plane is perpendicular to the first plane.

13. The lens array of claim 12, wherein the second lens element is arranged on a second plane that is parallel to and offset from the first plane.

14. The lens array of claim 12, wherein the space between the first lens element and the third lens element and the offset between the second plane and the third plane are sufficiently sized such that radiation directed to or emitted from adjacent lens elements of the high order array do not impinge upon one another.

15. The lens array of claim 12, wherein a lens comprised in the plurality of lens elements is a Luneburg lens.

16. The lens array of claim 12, wherein the plurality of lens elements in the high order array are configured to transmit and receive signals in microwave or radio frequencies.

17. The lens array of claim 12, wherein first lens element comprises a first lens and first feed element, the second lens element comprises a second lens and a second feed element, and the third lens element comprises a third lens and a third feed element.

* * * * *